Feb. 10, 1970   E. H. SCHWARTZMAN   3,494,190
FLUID FLOW TRANSDUCER
Original Filed Feb. 23, 1965
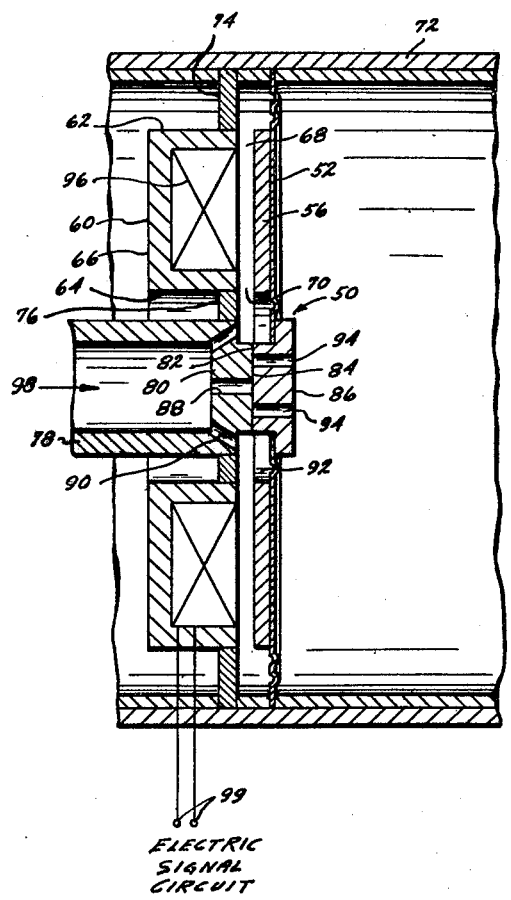
ELECTRIC
SIGNAL
CIRCUIT
INVENTOR
EVERETT H. SCHWARTZMAN
BY Nilsson + Robbins
ATTORNEYS

United States Patent Office 3,494,190
Patented Feb. 10, 1970

3,494,190
FLUID FLOW TRANSDUCER
Everett H. Schwartzman, 457 34th St.,
Manhattan Beach, Calif. 90266
Original application Feb. 23, 1965, Ser. No. 434,179, now
Patent No. 3,374,674, dated Mar. 26, 1968. Divided
and this application Feb. 28, 1968, Ser. No. 708,923
Int. Cl. G01f 1/26, 1/00
U.S. Cl. 73—228                                    7 Claims

ABSTRACT OF THE DISCLOSURE

An instrumentation transducer is disclosed for providing a signal which is precisely related to flow rates of a fluid stream which transducer is particularly effective for use with streams having avery low flow rates.

A single axially-displaceable armature is supported by an annular, flexible diaphragm which includes a paramagnetic section. A fixed toroidal cup (also of paramagnetic material) cooperates with the diaphragm to define a magnetic circuit. A coil, positioned in the cup may then be energized with an electrical current to manifest the relative positions of the diaphragm and the cup. The position between these members is determined by the flow rate of the fluid stream under observation. Specifically, a plurality of ducts or orifices are defined in offset association, respectively with the cup and the diaphragm, to pass the fluid stream and thereby develop forces to proportionately space the diaphragm from the cup.

BACKGROUND AND SUMMARY OF THE INVENTION

This is a divisional of applicants co-pending United States Patent application, Ser. No. 434,179, now Patent No. 3,374,674 filed Feb. 23, 1965 and entitled Fluid Flowmeter. The subject hereof is specifically directed to an offset-port transducer which structure is particularly effective in sensing a fluid stream at relatively low rates of flow.

Transducers heretofore available have provided measurements which are subject to errors due to non-constant characteristics of the fluid such as its viscosity, density, thermo-conductivity or the like. In addition, the instruments are typically mechanically unstable, fragile, or bulky or are costly and require complex electrical circuitry to compensate for their inherent non-linearity. Other disadvantages and limitations of prior art devices include their slow response time which precludes or limits their use in recording transients and in many other applications. Similarly, their utilization of a particular transducer is limited to a relatively narrow range of flow velocities. Other transducers suffer many of the disadvantages pointed out above and in addition introduce severe lubrication problems for a bearing of the rotating device, particularly in a cryogenic, radioactive, or chemically active environment. Furthermore, mechanical connections between a rotary device and external components also present serious problems of bearing lubrication and leakage. More particularly, the present structure affords an effective solution to certain of these porblems, particularly for metering lower rates of flow.

BRIEF DESCRIPTION OF THE DRAWINGS

The single figure herein is a longitudinal sectional view through a transducer constructed in accordance with the principles of the present invention.

DETAILED DESCRIPTION OF THE PREFERRED EMBODIMENTS

With specific reference now to the figures in more detail, it is stressed that the particulars shown are by way of example and for purposes of illustrative discussion only and are presented in the cause of providing what is believed to be the most useful and readily understood description of the principles and structural concepts of the invention. In this regard, no attempt is made to show structural details of the apparatus in more detail than is necessary for a fundamental understanding of the invention, the description taken with the drawings making apparent to those skilled in the art and technology of flowmeters how the several forms of the invention may be embodied in practice. Specifically, the detailed showing is not to be taken as a limitation upon the scope of the invention which is defined by the appended claims forming, along with the drawings, a part of this specification.

Referring to the figure, an example of the invention is illustrated which utilizes a single axially resiliently displaceable armature member 50 which is supported by an annular, axially flexible diaphragm 52. The diaphragm 52 may be fabricated of paramagnetic metal or is made effectively paramagnetic, as shown, by the bonding thereto of an annular paramagnetic ring member 56. The ring member may be mounted concentrically on the left hand face, as viewed in the drawing, of the diaphragm 52 and is axially spaced from and juxtaposed with respect to a toroidal cup member 60. The toroidal cup is formed by an outer rim member 62, an inner rim member 64, and an annular disk member 66 interjoining their left hand peripheries as shown. The cup member 60 thus formed and the annular disk or rig member 56 form in cooperation, a magnetic circuit about the periphery of the rectangular toroid generated form; the magnetic circuit including a pair of gaps 68, 70.

The toroidal cup member 60 is in this example supported rigidly with respect to the outer body member 72 by a rigid non-magnetic annular disk member 74. A second, inner disk member 76 is supportingly disposed between the inner paramagnetic rim member 64 and a stationary input conduit member 78. The right hand end of the conduit member 78 is partially occluded by an end member 80 having a right hand end face 82 which, in the absence of fluid flow through the system, is disposed in juxtaposed contact with the left hand face 84 of the armature member 50. In this example the end member 80 of the stationary inlet conduit member 78 is centrally ported by an axial duct 88 and a plurality of bleeder capillaries 90. The axial duct 88 communicates with the interface boundary between the faces 82, 84, while the bleeder capillaries 90 communicate with the toroidal space 92 between the juxtaposed diaphragm 52 and the annular disk members 74, 76. The armature member 50 is ported to form a plurality of axial ducts 94 which also communicate with the interface boundary between the faces 82, 84.

Under conditions of zero flow, the ends of the axial ducts 88, 94 at the interface boundary are substantially sealed from each other by virtue of the diaphragm 52, which retains the armature member 50 in contact with the end face 82. This axial disposition of the armature member 50 causes a predetermined minimum axial gap dimension to exist for the gaps 68, 70 for the magnetic circuit of a solenoid sensing coil 96 wound and disposed in a spool fashion within the toroidal cup of the member 60. When, however, a minute flow in the direction of the arrow 98 tends to flow in the direction indicated, a pressure is impressed upon the left hand face of the supporting diaphragm 52, through the capillaries 90 and upon the central portion of the left hand face 84 of the armature member 50 resulting in an axial force to the right of the armature member and its supporting diaphragm 52. Such an axial displacement results in a definite change in the reluctance of the magnetic circuit formed by the paramagnetic toroidal cup member 60 and the ring member 56 carried by the supporting diaphragm 52. The resulting sensor assembly or transducer system is thus extremely sensitive to near zero flow rates and provides a precision measuring function in flow metering not heretofore available. Specifically, an electrical current applied to the sensing coil 96, as through the terminals 99 will be influenced in accordance with the operation of the transducer structure and accordingly manifest the fluid flow stream.

There has thus been disclosed and described a number of examples of an electromagnetic flowmeter system and method according to the present invention which exhibit the advantages and achieve the objects set forth hereinabove.

What is claimed is:
1. A transducer for sensing flow of a fluid stream, comprising:
   a body defining a channel to receive said fluid stream;
   a first duct member, defining at least one duct therethrough;
   means for yieldably supporting said first duct member in said body so that said duct through said first duct member is open to said channel in said body;
   a second duct member affixed to said body to be held contiguous to said first duct member and defining at least one duct therethrough, offset from axial alignment with said duct in said first duct member whereby said first and second duct members afford a valving relationship therebetween to pass said stream, with displacement of said first duct member accommodated by said means for yieldably supporting said first duct member;
   channel means for applying said fluid stream whereby to develop a pressure force on said first duct member; and
   electrical means including paramagnetic means affixed to said duct members, for providing an electrical parameter indicative of the space relationship between said first duct member and said second duct member.

2. A transducer according to claim 1 wherein said electrical means includes first paramagnetic means affixed to said first duct member, second paramagnetic means affixed to said second duct member and electromagnetic means magnetically coupled to said first and said second paramagnetic means.

3. A transducer according to claim 1 wherein said means for yieldably supporting comprises a diaphragm affixed between said body and said first duct member, closing the space therebetween.

4. A transducer according to claim 1 wherein first duct member and said second duct member are supported and affixed in axially aligned relationship whereby mating surfaces thereon serve to close ducts in each of said members.

5. A transducer according to claim 4, wherein said electrical means includes first paramagnetic means affixed to said first duct member, second paramagnetic means affixed to said second duct member and electromagnetic means magnetically coupled to said first and said second paramagnetic means, wherein said means for yieldably supporting comprises a diaphragm affixed between said body and said first duct member, closing the space therebetween.

6. A transducer according to claim 4, wherein said electrical means includes first paramagnetic means affixed to said first duct member, second paramagnetic means affixed to said second duct member and electromagnetic means magnetically coupled to said first and said second paramagnetic means.

7. A transducer according to claim 4 wherein said means for yieldably supporting, comprises a diaphragm affixed between said body and said first duct member, closing the space therebetween.

References Cited

UNITED STATES PATENTS

| | | | |
|---|---|---|---|
| 1,025,809 | 5/1912 | Kieser | 73—228 X |
| 2,487,083 | 11/1949 | Warshaw. | |
| 2,538,785 | 1/1951 | Karig | 73—211 X |
| 2,769,337 | 11/1956 | Rich | 73—228 X |

FOREIGN PATENTS

| | | |
|---|---|---|
| 251,194 | 4/1926 | Great Britain. |

RICHARD C. QUEISSER, Primary Examiner
JOHN K. LUNSFORD, Assistant Examiner

U.S. Cl. X.R.
73—205